United States Patent [19]

Hettche et al.

[11] Patent Number: 4,680,327

[45] Date of Patent: * Jul. 14, 1987

[54] STABILIZERS

[75] Inventors: Albert Hettche, Hessheim; Stefan Weiss, Neckargemuend; Hubert Trauth, Dudenhofen; Peter Lechtken, Frankenthal; Michael Horner, Neustadt, all of Fed. Rep. of Germany

[73] Assignee: BASF Aktiengesellschaft, Ludwigshafen, Fed. Rep. of Germany

[ * ] Notice: The portion of the term of this patent subsequent to Apr. 16, 2002 has been disclaimed.

[21] Appl. No.: 823,744

[22] Filed: Jan. 29, 1986

[30] Foreign Application Priority Data

Feb. 14, 1985 [DE] Fed. Rep. of Germany ....... 3504981

[51] Int. Cl.[4] .............................................. C08K 5/15
[52] U.S. Cl. .................... 524/110; 252/393; 252/404; 252/407; 524/313; 524/317; 524/318
[58] Field of Search ............... 524/110, 318, 313, 317; 252/393, 404, 407

[56] References Cited

U.S. PATENT DOCUMENTS

| | | | |
|---|---|---|---|
| 4,363,891 | 12/1982 | Rosen et al. | 524/318 |
| 4,451,604 | 5/1984 | Mills | 524/313 |
| 4,511,685 | 4/1985 | Nissen et al. | 524/110 |

FOREIGN PATENT DOCUMENTS 53-137244  11/1978  Japan .

*Primary Examiner*—Veronica P. Hoke
*Attorney, Agent, or Firm*—Oblon, Fisher, Spivak, McClelland & Maier

[57] ABSTRACT

Stabilizers consisting of (a) 2,5,7,8-tetramethyl-2-(2'-stearyloxyethyl)-chroman and (b) glyceryl stearate, glyceryl hydroxystearate, partial esters of stearic acid with condensates of glycerol and trimethylolpropane, triglyceryl stearate and/or tetraglyceryl stearate, with or without further conventional additives, the weight ratio of (a) to (b) being from 10:1 to 1:10, give improved stabilization to discoloration and superior stability during processing when used in plastics such as polyethylene or polypropylene.

3 Claims, No Drawings

STABILIZERS

The present invention relates to novel stabilizers for plastics, which are based on chroman and glycerol derivatives, their use for stabilizing polyolefins, and plastics which contain the novel stabilizers.

German Pat. Nos. 1,143,319 and 1,136,102 disclose that α-tocopherol can be used as a stabilizer for plastics. However, α-tocopherol gives rise to discolorations, so that it is virtually completely unsuitable for stabilizing, in particular, colorless plastics. Moreover, the level of stabilization does not correspond to that achieved with phenolic stabilizers. For this reason, α-tocopherol cannot replace the conventional commercial phenolic stabilizers such as

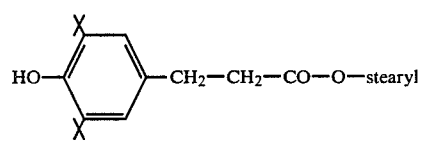

(Ia)

or

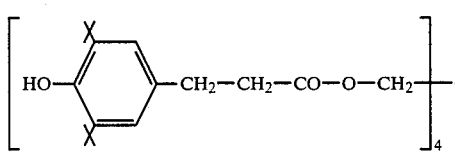

(Ib)

although the physiologically acceptable natural substance α-tocopherol is as such preferable and furthermore the phenolic stabilizers are not satisfactory in every respect.

Japanese Preliminary Published Application No. 141 354/1978 discloses that mixtures of α-tocopherol with a saccharide or with a polyhydric alcohol are more stable to discoloration than are the tocopherols alone, although the stabilization effects are not adequate.

German Laid-Open Application Nos. DOS 3,010,505, DOS 3,103,707 and DOS 3,103,740 disclose attempts to replace α-tocopherol and the phenolic stabilizers with more effective agents. In these applications, chroman derivatives of the formula

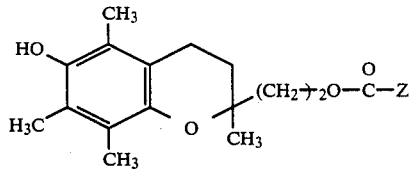

(II)

where Z is $C_7$-$C_{30}$-alkyl, $-CH_2$-$CH_2$-$S$-$C_1$-$C_{30}$-alkyl or

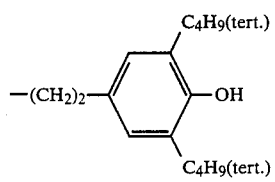

and their use for stabilizing organic materials are described.

It is an object of the present invention to provide better stabilizers than the chroman derivatives (II).

We have found that this object is achieved, and that stabilizers possessing improved stabilizing properties are obtained, if they contain (a) 2,5,7,8-tetramethyl-2-(2'-stearyloxyethyl)-chroman and (b) glyceryl monostearate, glyceryl tri-12-hydroxystearate, triglyceryl stearate, tetraglyceryl stearate, partial esters of stearic acid with condensates of trimethylolpropane and glycerol in a molar ratio of from 1:10 to 10:1, or a mixture of these stearates, with or without (c) additives conventionally used in such stabilizers.

Compared with the conventional chroman derivatives, the mixtures according to the invention exhibit in polyolefins, in particular in polyethylene and polypropylene, improved stabilization to discoloration and superior stability during processing.

Component (a) and its preparation are known (EP-B 36 169, Examples 15 and 22).

Components (b) are known. The partial esters of the condensates of glycerol with trimethylolpropane contain one or more stearoyl radicals in the molecule, preferably an average of from 0.2 to 1.0 stearoyl group per hydroxyl oxygen atom, ie. the degree of esterification is from 0.2 to 1.0.

The weight ratio of (a) to (b) in the mixture is from 1:10 to 10:1, preferably from 1:1 to 1:6.

Examples of suitable components (c), which may or may not be present, are the synergistic agents conventionally used for stabilization, eg. calcium stearate and distearyl thiodipropionate $(S(CH_2-CH_2-COO-C_{18}H_{37})_2)$. The amount of (c) is as a rule from 50 to 500% by weight, based on (a+b).

When the stabilizers according to the invention are used, it is also possible to employ additional stabilizers or synergistic agents.

The stabilizers according to the invention are used, as a rule, in an amount of from 0.05 to 1.0% by weight, based on the plastic to be stabilized. However, the optimum amounts required to achieve the desired stabilization effects and cost-effectiveness may also be outside the stated range and can be readily determined by a few experiments.

The stabilizers can be prepared by mechanically mixing the components (a), (b) and, where relevant, (c), for example by milling them together or by coprecipitation from a solution of the components (a), (b) and (c) in a polar solvent, such as an alcohol or acetone, by the addition of a less polar organic liquid.

The stabilizers can also be used to prepare masterbatches with plastics, and these masterbatches can then be processed together with the plastics to be stabilized.

Masterbatches are advantageous for processing since they are easier to handle and to meter during processing than the pulverulent or pasty mixtures of (a), (b) and, where relevant, (c).

Particularly suitable plastics are thermoplastics, such as styrene polymers, polyvinyl chloride, nylons, polybutylene terephthalate and preferably polyethylene and polypropylene.

The suitability and effectiveness of stabilizers are based in particular on the following criteria: 1. The color: the plastic should not be discolored by the stabilizer. This requirement is particularly important for colorless plastics. 2. Stability during processing: this is the constancy of the properties of thermoplastics when subjected to mechanical and thermal loads during shaping processes such as extrusion or injection molding. A measure of the stability during processing can be derived from the change in the melt behavior of the particular thermoplastics after repeated shaping with melting: melt flow index test according to DIN 53,735.

Another important criterion with regard to stability during processing is the change in color after repeated shaping with melting. This change should be very small: yellowness test (ASTMD 1925).

The novel stabilizers meet the requirement of point 1 in a satisfactory to excellent manner. In this respect, they are superior to the α-tocopherols and the pure component (a).

With regard to point 2, the novel stabilizers have particular advantages over the prior art phenolic stabilizers.

The Examples which follow illustrate the invention.

The stabilizer-containing polymers were assessed with regard to color quality and stability during processing. I. *The color quality* was stated as the yellowness index YI, determined in polypropylene by the yellowness test according to ASTMD 1925.

The higher the values, the poorer is the color quality, ie. the more pronounced the discoloration. In the case of the color quality, the stated values correspond to the visual impressions mentioned:

| | |
|---|---|
| up to 2: | no detectable discoloration |
| from 3 to 5: | very slight discoloration |
| from 5 to 10: | slight but clearly detectable discoloration |
| from 10 to 20: | marked discoloration |
| >20: | strong discoloration. |

In every case, the stabilizer was incorporated in the same manner, the material was converted to granules of 15 mm layer thickness, and these were shaped into 1 mm thick sheets, for which the yellowness index was determined.

II. The *stability during processing* was determined on the same polypropylene samples as those used in (I). To do this, the mixture was extruded, and the extrudates granulated. The melt index according to DIN 53,735 was determined on this sample which had been extruded once ($MFI_1$). This sample was then extruded and granulated a further 5 times, and the melt flow index of this product was then determined as described above ($MFI_6$).

The melt flow indices were expressed as the quotient $$\frac{MFI_6}{MFI_1}$$

The greater the quotient, the lower is the stability during processing.

Furthermore, the yellowness indices $YI_1$ and $YI_6$ were determined, as described in (I), for the samples obtained after extrusion and granulation once and after extrusion and granulation six times.

The polypropylene used in each case was additive-free dechlorinated polypropylene.

EXAMPLES 1 TO 7

The stated amount of the stabilizer mentioned in the Table below was incorporated into additive-free dechlorinated polypropylene by extrusion, and the material was granulated.

The yellowness index of the granules was determined according to (I), and their melt flow index was determined according to (II), these determinations being carried out after extrusion had been effected once and six times. The results of the measurements are summarized in columns 5 to 8 of the Table.

If (i) trimethylolpropane/glycerol condensates which are partially esterified with stearic acid and have a degree of esterification of from 0.2 to 0.9 and (ii) tri and/or tetraglycerols which are partially esterified with stearic acid (degree of esterification 0.2–0.9) are used as (b), similar results are obtained.

TABLE

| Example | (a) | Stabilizer (b) | Concentration %[3] | Ratio (a):(b) (parts by weight) | Melt flow index $MFI_1$ | $MFI_6$ | Yellowness index $YI_1$ | $YI_6$ |
|---|---|---|---|---|---|---|---|---|
| 1 | (a) | glyceryl monostearate | 0.1 | 1:2 | 4.3 | 9.4 | 1.0 | 7.5 |
| 2 | (a) | glyceryl monostearate | 0.1 | 1:4 | 4.2 | 9.2 | 0.7 | 4.3 |
| 3 | (a) | glyceryl tri-12-hydroxystearate | 0.1 | 1:2 | 4.4 | 9.5 | 1.7 | 7.6 |
| 4 | (a) | glyceryl tri-12-hydroxystearate | 0.1 | 1:4 | 4.2 | 9.3 | 1.0 | 4.6 |
| 5 | (a) | TMP/glycerol (1:4) condensate stearate[1] | 0.1 | 1:2 | 4.3 | 8.9 | 2.1 | 7.5 |
| 6 | (a) | TMP/glycerol (1:4) condensate stearate[1] | 0.1 | 1:4 | 4.1 | 8.5 | 1.5 | 4.5 |
| 7 | (a) | tri/tetraglyceryl stearate[2] | 0.1 | 1:2 | 4.7 | 9.7 | 2.2 | 10.5 |
| | | | 0.1 | 1:4 | 4.5 | 9.5 | 2.1 | 8.1 |
| Comparison | (a) | — | 0.1 | 1:0 | 4.2 | 89 | 4.0 | 17.0 |

(a) = 2,5,7,8-tetramethyl-2-(2′-stearyloxyethyl)-chroman
[1] condensate of trimethylolpropane (TMP) and glycerol (molar ratio 1:4), esterified with stearic acid (degree of esterification: 0.75)
[2] triglycerol/tetraglycerol mixture esterified with stearic acid (degree of esterification: 0.75)
[3] based on polypropylene

We claim:

1. A stabilizer for plastics which contains
   (a) 2,5,7,8-tetramethyl-2-(2′-stearyloxyethyl)chroman and
   (b) glyceryl monostearate, glyceryl tri-12-hydroxystearate, a partial ester of stearic acid with a condensate of trimethylolpropane and glycerol in a molar ratio of from 1:10 to 10:1, triglyceryl stearate, tetraglyceryl stearate, or a mixture of these stearates, the weight ratio of (a) to (b) being from 1:10 to 10:1.

2. The stabilizer for plastics according to claim 1, wherein the weight ratio of (a) to (b) is from 1:1 to 1:6.

3. A plastic containing from 0.05 to 1% by weight, based on the plastic, of a stabilizer as claimed in claim 1.

* * * * *